May 8, 1923.  
I. H. HALL  
1,454,378  
MACHINE FOR HOMOGENEOUSLY MIXING AND STRAINING EGG MELANGE  
Filed Feb. 3, 1923  
2 Sheets-Sheet 1

I. Harvey Hall

May 8, 1923.                                                       1,454,378
I. H. HALL
MACHINE FOR HOMOGENEOUSLY MIXING AND STRAINING EGG MELANGE
Filed Feb. 3, 1923                         2 Sheets-Sheet 2
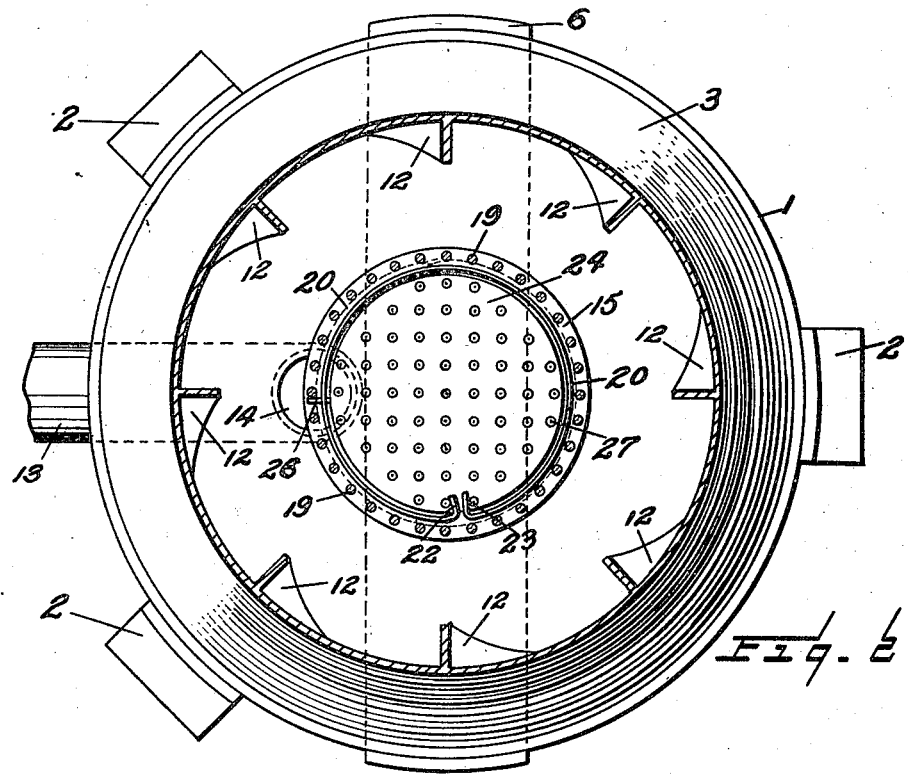
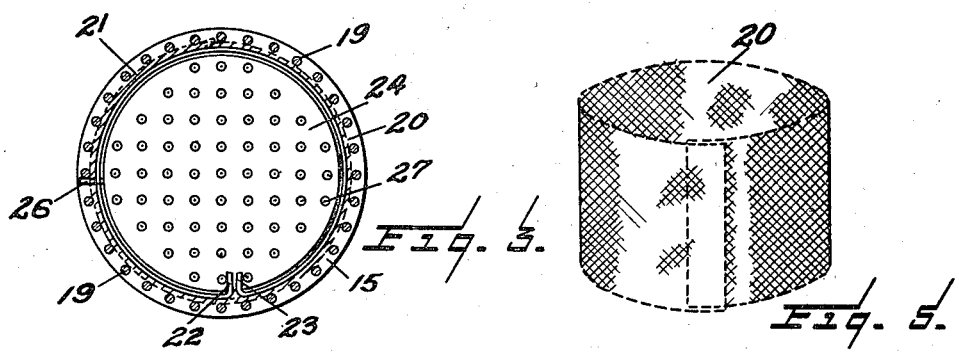
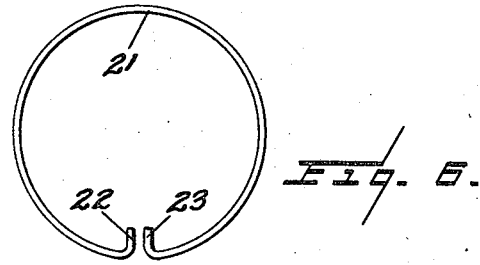
I. Harvey Hall Patented May 8, 1923.

1,454,378

UNITED STATES PATENT OFFICE.

IPHUS HARVEY HALL, OF TORONTO, ONTARIO, CANADA.

MACHINE FOR HOMOGENEOUSLY MIXING AND STRAINING EGG MELANGE.

Application filed February 3, 1923. Serial No. 616,805.

*To all whom it may concern:*

Be it known that I, IPHUS HARVEY HALL, a citizen of the United States, and a resident of the city of Toronto, in the county of York, in the Province of Ontario, Canada, have invented certain new and useful Improvements in Machines for Homogeneously Mixing and Straining Egg Melange, of which the following is the specification.

My invention relates to improvements in machines for homogeneously mixing and straining egg melange and the object of the invention is to device a simple machine by which eggs may be homogeneously and therefore thoroughly mixed to provide a fluid of equal consistency throughout, in which all particles of egg shell, skin, germ clots and other foreign matter will be removed and at the same time provide a machine which may be easily, thoroughly and quickly cleansed whenever desired and it consists essentially of the arrangement and construction of parts as hereinafter more particularly explained.

Fig. 2 is a plan section on line 2—2, Fig. 1.

Fig. 3 is a plan detail of the sieve holder, sieve and parts contained therein.

Fig. 4 is a perspective detail of the egg yoke breaking device.

Fig. 5 is a perspective detail of the straining sieve.

Fig. 6 is a plan detail of the spring clip for holding the straining sieve in position within the sieve holder.

In the drawings like characters of reference indicate corresponding parts in each figure.

Figure 1:
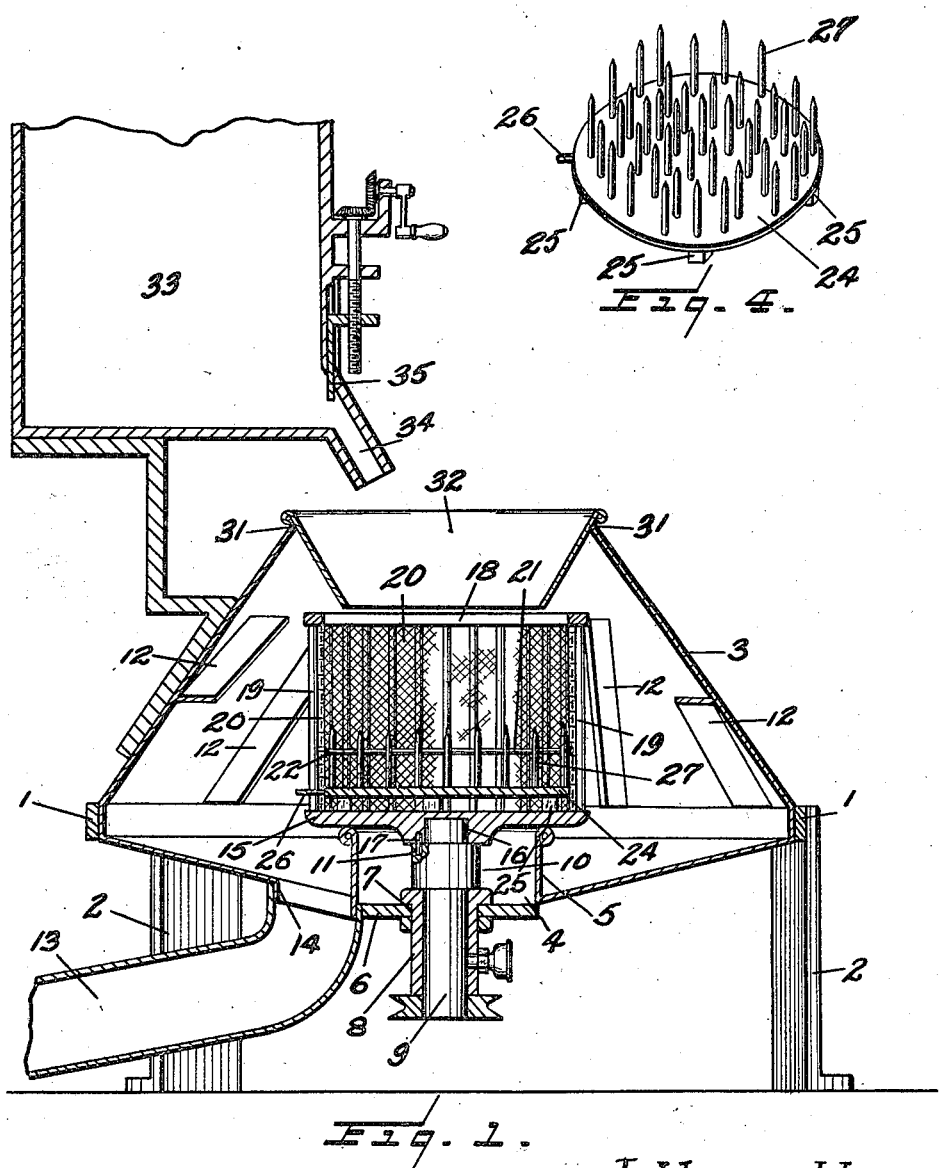
Fig. 1 is a vertical section through my machine.

1 indicates a base, the main portion of which is angular and from which depends a suitable number of supporting legs 2. 3 is the main container or casing of my egg mixing and straining machine. The container 3 is cone frustum in form having an open upper end 31. The casing 3 is cylindrical and provided in its bottom wall with a centre opening 4 from which extends an upwardly directed annular flange 5. 6 is a cross support extending diametrically of the machine beneath the orifice 4 and provided with a central opening 7 in which is located a depending bearing sleeve 8.

9 is a short shaft journalled in the sleeve 8 and provided in proximity to its upper end with a cylindrical enlargement 10. The enlargement 10 is provided in its upper end with a small recess or orifice 11. 12 are a series of flanges extending inwardly from the inner periphery of the casing 3 and set in an inclined or spiral direction, the lower end being in advance of the upper in relation to the direction of rotation of the machine. 13 is a discharge spout extending from an orifice 14 formed in the bottom of the casing 3.

It will be noted that the upper end of the shaft 9 extends slightly above the upper edge of the flange 5. 15 is the bottom or base of my sieve container, such base being provided in its lower face with a central recess 16 into which the upper end of the shaft 9 extends. 17 is a pin or similar projection projecting downward from the lower face of the base 15 into the orifice 11 of the shaft enlargement 10. 18 is an annular member located in the vertical alignment with the outer periphery of the base 15 and connected thereto by a series of vertical rods 19 spaced at suitable distances apart.

The base 15, annular member 18 and vertical rods 19 form a cylindrical cage forming a sieve container. 20 is a strip of mesh fabric which fits around the interior of the container and against the vertical rods 19.

It will be noted that the ends of the strip 20 slightly overlap each other as clearly shown in Fig. 5. 21 is a spring split ring having inturned ends 22 and 23. The split ring when contracted by pressing the inturned ends 22 and 23 together is inserted within a sieve 20 and when freed expands so as to force the sieve outward and grip it against the rods 19 thereby holding it in place.

24 is a circular plate fitting within the screen 20 and provided with feet 25 resting upon the base 15. 26 is a projection extending from the outer edge of the plate 24 between the pair of rods 19 so as to prevent any rotary movement of the plate in relation to the sieve holder or in other words insure that the plate and sieve holder rotate in unison. 27 are a series of pin projections extending upward from the upper face of the plate 24 for a purpose which will hereinafter appear.

In the opening 31 of the casing 3 is supported a central hopper 32. 33 is a container for the broken eggs provided with a discharge spout 34 extending over the hopper 32. 35 is a suitable form of gate valve for controlling the discharge through the discharge spout 34.

Having described the principal parts involved in my invention I will briefly describe the operation of the same.

The shells of the eggs are manually broken and the egg yolks and whites placed in the container 33 forming a reservoir therefor, the gate valve 35 of course being closed. When the supply is sufficient the gate valve is opened to control the flow of the broken eggs into my mixer and separator. The shaft 9 is then driven by a suitable means such as a pulley drive so as to rotate the severing container and the parts carried thereby.

As the eggs fall from the discharge spout 34 they pass through the hopper 32 and to the pin projection 27 which pierce and break them so that they will flow and mix with the whites and as the mixed fluid is gradually forced outward it is carried by a centrifugal force through the screen 20 dividing the flow into small streams so that they again mix and intermix in passing outward against the inner periphery of the container 3.

The rotary movement of the sieve container tends to carry the fluid as it passes outward circumferentially around the inner surface of the container 3 and is thereby carried against the inclined flanges 12 which carry the fluid downward to the bottom of the container and from thence outward through the discharge spout 13.

By reason of the cone frustum shape of the container 3 the egg, after passing through the screen, is directed downward and carried outward so that the passage of the egg through the lower portion of the screen where the greatest quantity of egg passes through is not impeded or held back thereby permitting of a free quick outward flow of the mixed egg.

It will thus be seen from the above description that I have devised a device which will thoroughly break up and mix the egg yolks and whites so as to produce an absolutely homogeneous mixture, which will be free from all particles, such as bits of broken egg, egg skin and the like rendering the fluid immediately adaptable for use.

What I claim as my invention is:

1. A machine for homogeneously mixing and straining egg melange comprising a stationary conical receptacle having a receiving opening in the upper portion thereof through which shelled eggs are dropped and a discharge opening in the bottom portion thereof, and means located within the receptacle for breaking the yolk skins of the shelled eggs as each egg is dropped after passing through the receiving opening of the receptacle and for discharging the broken yolks radially against the walls of the receptacle to commingle as they flow down the interior periphery of such receptacle to the discharge thereof.

2. A machine for homogeneously mixing and straining egg melange comprising a stationary receptacle having an egg receiving opening in the upper portion thereof and a discharge opening in the bottom portion thereof, a revolving element located within the receptacle provided with upwardly extending spicular projections onto which shelled eggs are dropped through the inlet orifice of the receptacle to be broken up and discharged radially from such element against the interior periphery of the receptacle to commingle as they pass downward to the discharge.

3. A machine for homogeneously mixing and straining egg melange comprising a stationary receptacle having an inlet orifice in the upper portion thereof and a discharge orifice in the lower portion thereof, a revolving element located within the receptacle, a removable yolk breaking means carried by such element onto which the shelled eggs are dropped through the inlet orifice of the receptacle to be discharged radially in fluid form therefrom, means for breaking up the radially discharged fluid into fine streams to commingle upon impact against the interior periphery of the receptacle and as they pass down to the discharge thereof.

4. A machine for homogeneously mixing and straining egg melange comprising a stationary receptacle having a receiving opening in the upper portion thereof and a discharge opening in the lower portion thereof, a revolving element located within the receptacle, means carried by such element for breaking the yolk skins as the shelled eggs are thrown thereonto through the inlet orifice of the receptacle, and an annular screen surrounding such yolk breaking means through which the fluid is forced by centrifugal action against the interior periphery of the receptacle.

5. A machine for homogeneously mixing and straining egg melange comprising a main receptacle having an inlet orifice in the upper portion thereof and a discharge orifice in the lower portion, a revolving element located within the receptacle, means carried by the element upon which the shelled eggs are thrown to break up the yolks which are thrown therefrom by centrifugal action, and means for simultaneously breaking up the fluid into fine streams and straining it as it passes radially to the interior periphery of the receptacle to commingle there-against.

6. A machine for homogeneously mixing and straining egg melange comprising a main receptacle having an inlet opening in the top portion and a discharge opening in the bottom portion, a horizontal table revolubly mounted within the receptacle, a series of upwardly extending spicular projections carried by the table upon which the shelled eggs are thrown to break up the yolks and from which the yolks are thrown radially, and means for simultaneously dividing the fluid into fine streams and straining it as it passes radially to impinge against the interior periphery of the receptacle.

7. A machine for homogeneously mixing and straining egg melange comprising a main receptacle having an inlet opening in the top portion and a discharge opening in the bottom portion, a horizontal supporting member, a series of upwardly extending spicular projections carried by the member and upon which the shelled eggs are thrown to break up the yolks and from which the yolks are thrown radially, and an annular screen surrounding the spicular projections through which the broken eggs are carried by centrifugal force against the interior periphery of the receptacle.

8. A machine for homogeneously mixing and straining egg melange comprising a main receptacle having a receiving opening in the top thereof and a discharge opening in the bottom, a horizontal table revolubly mounted within the receptacle, means for breaking up the egg yolks passed through the receiving opening of the receptacle, an annular cage carried by the table provided with a series of spaced apart rods, and a screen fitting within the rods through which the broken eggs are forced by centrifugal action.

9. A machine for homogeneously mixing and straining egg melange comprising a stationary receptacle provided with an inlet opening at the top and a discharge opening at the bottom, a table revolubly mounted within the receptacle, egg breaking means carried by the table and egg straining and commingling means surrounding such egg breaking means and carried by the table and comprising an annular cage consisting of an upper ring and spaced apart vertical bars extending between the table and the ring, and a strip of wire mesh fitted within the vertical bars to form an annular strainer through which the broken egg is forced by centrifugal action.

10. A machine for homogeneously mixing and straining egg melange comprising a stationary receptacle provided with an inlet opening at the top and a discharge opening at the bottom, a table revolubly mounted within the receptacle, egg breaking means carried by the table and egg straining and commingling means surrounding such egg breaking means and carried by the table and comprising an annular cage consisting of an upper ring and spaced apart vertical bars extending between the table and the ring, a strip of wire mesh fitted within the vertical bars to form an annular strainer through which the broken egg is forced by centrifugal action, and a split spring ring fitting within the screen and adapted to force it outwardly against the vertical rods.

11. A machine for homogeneously mixing and straining egg melange comprising a stationary receptacle having an inlet opening at the top and a discharge opening at the bottom, a table revolubly mounted within the receptacle, a plate provided with feet resting upon the table, a spicular projection extending upwardly from the plate, and egg straining and commingling means carried by the table and surrounding the plate and extending upwardly therefrom and through which the broken eggs are adapted to be forced by centrifugal action.

12. A machine for homogeneously mixing and straining egg melange comprising a stationary receptacle having an inlet opening at the top and a discharge opening at the bottom, a table revolubly mounted within the receptacle, a plate provided with feet resting upon the table, a spicular projection extending upwardly from the plate, an annular series of vertical spaced apart rods extending upwardly from the table around the plate, a screen fitting within the vertical rods and resting upon the table, and a pin projection extending from the plate through a pair of adjacent rods to hold the plate from rotation in relation to the table.

13. A machine for homogeneously mixing and straining egg melange comprising a stationary receptacle having an inlet opening at the top and a discharge opening at the bottom, a revolving element located within the receptacle and provided with means for breaking up the egg yolks to discharge them radially by centrifugal action to divide them into fine streams to impinge upon the interior periphery of the receptacle and spirally arranged flanges extending from the interior of the receptacle and inclining forward at the bottom in relation to the direction of the rotation of the element.

14. In a device of the class described, an egg straining device comprising a revolving element, an annular cage carried by the element, a free screen strip extending around the interior of the cage, and spring means for holding the strip outward against the cage.

15. In a device of the class described, an egg straining device comprising a revolving element, an annular ring, vertical spaced apart rods extending between the revolving element and the ring to form an annular cage, a screen strip free of the cage extending around the interior of the cage to overlap at its ends, and a spring ring fitting within the screen to force it outwardly against the rods.

16. In a device of the class described, the combination with the revolving table, a plate carried upon the table, and pin projections extending upwardly from the plate upon which the eggs are adapted to be impaled.

17. In a device of the class described, a revolving table, a ring, rods extending between the table and the ring to form an annular cage, a screen extending around the interior of the cage, a plate fitting within the screen and supported upon the table adjacent the lower edge of the screen, and pin projections extending upwardly from the plate.

IPHUS HARVEY HALL.